Jan. 21, 1969   M. G. MURRAY   3,422,587

PLASTERBOARD WITH A REMOISTENABLE PLASTER FACING

Filed Jan. 5, 1968

INVENTOR
Malcolm G. Murray

3,422,587
PLASTERBOARD WITH A REMOISTENABLE PLASTER FACING
Malcolm G. Murray, 93 Warwick Ave., Ormond Beach, Fla. 32074
Filed Jan. 5, 1968, Ser. No. 696,081
U.S. Cl. 52—232
Int. Cl. E04c 2/10; E04f 13/00; B32b 3/10
10 Claims

ABSTRACT OF THE DISCLOSURE

A fabricated wallboard has one side covered with a mixture of unset calcined gypsum (gypsum hemihydrate: $CaSO_4 \cdot \frac{1}{2} H_2O$) and an aggregate, held together by a suitable binder. When the facing is moistened by a water spray, it will soften and become plastic. Then it can be trowelled so that the material will coalesce at the joints between panels to form a continuous, homogeneous layer, similar to that obtained by conventional plastering. Reinforcements such as metal mesh can be pushed into the soft plaster in locations where strain is anticipated. Setting will occur as the hemihydrate takes up water of crystallization and becomes hydrous calcium sulfate.

$$(CaSO_4 \cdot 2H_2O)$$

In conventional plastering, the usual practice is to attach wallboards to the studs, furring strips, and ceiling beams by means of nails, clips, or adhesive. These wallboards may be plasterboards such as "Rocklath" or "Sheetrock" which consist of a gypsum core surrounded by heavy paper. The most common sizes are 16″ x 48″ and 4′ x 8′. Fibrous insulating boards such as "Celotex" or "Masonite" are also sometimes used. After the wallboard is in place, a layer of wet gypsum plaster and aggregate is applied manually to the outer face. This mixture consists of calcined gypsum (also known as plaster of Paris and as gypsum hemihydrate:

$$CaSO_4 \cdot \frac{1}{2} H_2O)$$

and an aggregate, which may be sand, perlite, vermiculite, or pumice of suitable fineness. These last three, while more costly than sand, have greater insulating value and are much lighter in weight, and therefore are easier to work with. Setting occurs as the hemihydrate takes up water of crystallization to form hydrous calcium sulfate ($CaSO_4 \cdot 2H_2O$). Commercial gypsum plasters contain small quantities of substances known as retarders which slow down the setting time, usually to two hours or more, as compared to the six to eight minute setting that would occur with the unmodified hemihydrate. There are also other substances known as accelerators which can be used to speed up the setting time when this is desirable. As the use of retarders and accelerators has been known for many years, details as to their composition and method of action need not be discussed here.

The first coat, which is generally about $\frac{1}{2}''$ thick, is occasionally left as is, or painted, but usually it is followed by a finish coat $\frac{1}{16}''$ to $\frac{1}{8}''$ thick containing calcium hydroxide ($Ca(OH)_2$). The calcium hydroxide hardens by slowly taking up carbon dioxide from the air to form calcium carbonate and not by recrystallization, as in the case of calcined gypsum. Since this invention relates to only the first plaster coat, no further reference need be made to finishing coats except to state that finishing plaster coats or paints can be applied over the plasterboard of this invention just as satisfactorily as over conventional plastering.

The advantages of this invention are that considerable time and labor in mixing and applying plaster can be saved. In addition, the necessity for using grounds, screeds, and dots to line up the work is reduced, due to the uniform thickness of the plaster mix on the panels; and the manual labor of lifting the heavy, wet, plaster mix to walls and ceilings is eliminated. Also there is less cleaning up.

Figure 1:
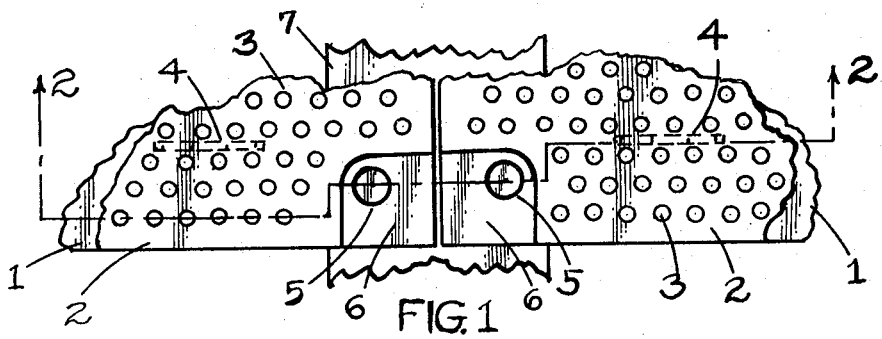
FIG. 1 is a fragmentary view showing one embodiment of this invention nailed to a 2 x 4 stud and before being moistened and trowelled.

In FIG. 1, 1 is a base panel of commercial plasterboard or insulating board, and 2 is a remoistenable plaster facing placed on the outer side of panel 1. Indentations 3 are provided in the facing to increase its surface, so as to facilitate the absorption of water when the facing is sprayed. It will be seen from FIG. 2 that these indentations are several times deeper than they are wide.

Metal prongs 4 are provided in the form of staples inserted at intervals to hold the facing to the base panel (prongs are not required in all methods of manufacture); 5 is a nail to fasten the wallboard to the stud; 6 is a cutout portion on the edge of the facing to facilitate nailing; and 7 is a 2 x 4 stud in a wall partition.

Figure 2:
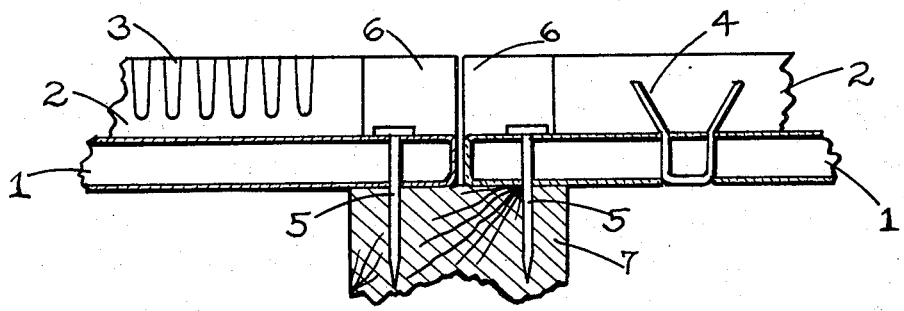
FIG. 2 is a sectional view taken on line 2—2 of FIG. 1.

After the plaster-faced wallboard is installed as indicated in FIG. 1 and FIG. 2, the entire outer surface is moistened by means of a water spray until the facing softens and becomes plastic. The facing is then trowelled to a planar surface, obliterating the indentations, covering the nail heads, and filling the joints, to make a continuous, homogeneous layer of plaster.

Figure 3:
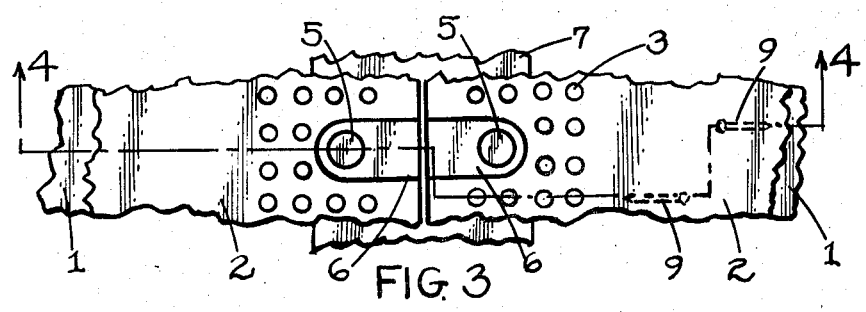
FIG. 3 is a fragmentary view showing another embodiment of this invention nailed to a 2 x 4 stud and before being moistened and trowelled.
Figure 4:
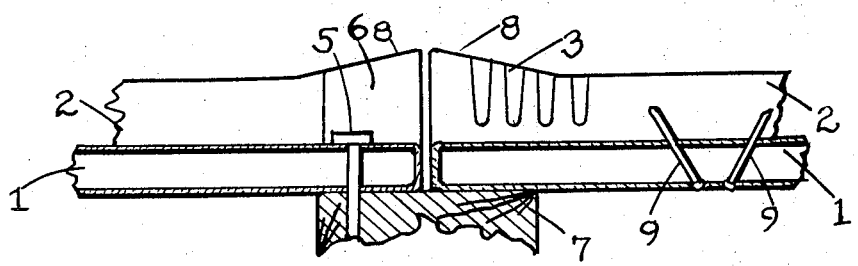
FIG. 4 is a sectional view taken on line 4—4 of FIG. 3.

In FIG. 3 and FIG. 4, the same reference numerals apply. Raised margin 8, which does not appear in FIG. 1 and FIG. 2, consists of additional remoistenable plaster facing. It is provided with indentations 3 to facilitate water absorption. Brads 9 secure the facing 2 to the base panel 1. They have the same function as staples 4 in FIG. 1 and FIG. 2 and are not required in all methods of manufacture.

After the wallboard shown in FIG. 3 and FIG. 4 is fastened to the framing, the entire outer surface is sprayed with water, but only the portion adjacent to the joints is given enough water to soften appreciably. This portion is then trowelled to fill the joints and cover the nail heads. The raised margin 8 furnishes enough material for this purpose. The lesser amount of water supplied to the rest of the surface is sufficient to cause the plaster to set and no trowelling is necessary on this portion.

EXAMPLE

Although there are several methods of manufacturing this plaster-faced wallboard, a preferred method of making the wallboard shown in FIG. 1 and FIG. 2 will be discussed in some detail first, and then more general instructions will be given for other methods. In this preferred method, magnesium sulfate is used as the binder. It is available in three forms: anhydrous magnesium sulfate ($MgSO_4$), kieserite ($MgSO_4 \cdot H_2O$) and Epsom salt ($MgSO_4 \cdot 7H_2O$). Approximately two parts by volume of perlite are mixed dry with one part of commercial gypsum plaster, but higher proportions of gypsum plaster may be used if greater strength is desired. A mixture of 220 parts by weight of water, 33 parts Epsom salt and 4 to 10 parts U.S. Gypsum Company's "Red Top Retarder" is then poured on the dry mixture in sufficient quantity to form a plastic mass when thoroughly mixed. The plastic mass should be readily spreadable but not runny, and the proportions of binder solution to plaster-aggregate mixture are determined empirically for each batch, as persons skilled in this art know. Thus, the proportions are better described in this fashion than by numerical values. This plastic mass is then spread on one face of a commercial plasterboard base panel to a depth of about 9/16", compressed against the plasterboard, and indented by the use of a complementarily shaped mold sheet lubricated with kerosene. The indenting operation will cause the thickness of the compressed wet plaster facing to increase 10% to 15%. The plasterboard base panel with the wet plaster mix on top is then conveyed to an oven whose temperature is about 650° F. and heated for ten to fifteen minutes. If desired, a somewhat higher temperature can be used at the start of the heating cycle and a lower temperature at the finish, since the wet plaster protects the base panel from burning. The heat should come from above and preferably should be electric to permit close regulation. After cooling, the panel may be stored until used.

The embodiment shown in FIG. 3 and FIG. 4 can be made in a similar manner except that a forming operation is added to make the raised margin and the indentations are confined to this vicinity. In the baking operation, the oven temperature is reduced and the time lengthened. This is necessary because a high temperature would cause surface cracks due to rapidly escaping steam. In the embodiment shown in FIG. 1 and FIG. 2, the numerous indentations facilitate the escape of steam and obviate this difficulty. The metal prongs shown as staple 4 in FIG. 1 and FIG. 2 and as brads 9 in FIG. 3 and FIG. 4 may be omitted in this method of manufacture.

Organic binders such as "Orzan" (Crown Zellerbach's ammonium lignin sulfonate) or high solubility dextrins can be used as binders instead of inorganic salts. Inorganic compounds such as Epsom salt have the advantage of being able to withstand high temperatures, thereby permitting faster manufacturing operations. Oven temperatures much over 400° F. decompose or carbonize most organic binders and render them insoluble. This hinders the absorption of a water spray. Epsom salt acts as an accelerator to the setting of gypsum plaster, and it is therefore desirable to add retarder to counter this effect, even though the commercial gypsum plaster already has some retarder in it. If the liquid mixture of water, Epsom salt, and retarder is to be stored for any considerable time, it is advisable to add a small percentage of disinfectant such as "Clorox" to prevent the formation of mold.

A clay, such as bentonite, can also be used as a binder. The dry powdered clay is mixed with the dry powdered gypsum plaster, and this mixture is then mixed with the dry aggregate, after which sufficient water is added to make a plastic mass which is spread on the plasterboard panel, and compressed and indented as previously outlined. The oven temperature can be as high as when an inorganic salt is used as a binder. The baked coating is not quite as hard as when magnesium sulfate is used as a binder and, after the coating is moistened with water, it takes somewhat longer to fully harden. It is advisable to limit the volume of clay to not much more than 10% of the volume of gypsum plaster.

Another method of manufacture is to wet the aggregate with an aqueous mixture similar to that previously mentioned except that the proportion of Epsom salt is about twice as great. The aggregate is then dried until it is only very slightly damp, mixed with commercial gypsum plaster, applied to the plasterboard base panel, compressed, indented and formed as required, and baked as previously outlined. In this method it is necessary to employ the staples 4, the brads 9, or some other form of prong to secure the plaster facing to the plasterboard base. The prongs may be inserted in the plasterboard base before the plaster facing is applied or after the compressing operation.

Two other methods of manufacture using raw gypsum ($CaSO_4 \cdot 2H_2O$) instead of calcined gypsum $$(CaSO_4 \cdot \tfrac{1}{2} H_2O)$$

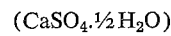

are possible. Both require prongs to hold the plaster facing to the plasterboard base. In one of these methods, a wet mix of aggregate, raw gypsum powder, and a binder solution as outlined in the preferred method previously listed is spread on the plasterboard panel, compressed, indented, or formed and indented, and baked. In the other method, the aggregate is mixed with a binder having a higher Epsom salt content, as recited in the second method, and after partial drying, is mixed with raw gypsum powder, compressed, indented, or formed and indented, and baked as in the second method. The baking time in both these methods using raw gypsum is relatively long (more than an hour), but these methods may prove economical where a large amount of oven capacity is available.

Other parameters useful in the practice of the invention are the following:

The backing sheet of gypsum board or fiberboard, to which the coating of the present invention is applied, should have a thickness of about 3/16" to about 3/4". A thickness of about 3/8" is preferred. The gypsum plaster coating itself should have a thickness of about 3/8" to about 3/4". When the binder is magnesium sulfate, it should preferably be used in water solution. When the binder is bentonite, it may be incorporated in the dry mix as previously indicated, or used as a thorough dispersion in water. The percentage of binder in the water can be widely varied, as the water is driven off in any event during baking. The aggregate is used in entirely conventional proportions and is entirely conventional in nature. Persons skilled in this art already are quite familiar with the proportions and identities of aggregate, and need not be further instructed along this line. The binder is used in a small but effective amount to perform its binding function in the preplastered board of the present invention. When Epsom salt is used, the binder should be from about 1.5 to about 30% by weight of the gypsum plaster on a dry weight basis, preferably about 10% by weight. As Epsom salt contains approximately 50% by weight water of crystallization, it will be recognized that if anhydrous magnesium sulfate is used instead, then these proportions become about 0.75 to about 15% by weight for the broad range, and about 5% by weight for the preferred value. When bentonite is used as the binder instead of hydrous or anhydrous magnesium sulfate, then the broad range is about 1.5 to about 8% by weight, preferably about 3% by weight of the gypsum plaster on a dry weight basis. In general, bentonite gives a somewhat softer and weaker product and should be used in proportions near the lower end of it srange. Magnesium sulfate is preferable as the binder.

Having described my invention, I claim:

1. A plasterboard comprising a rigid backing sheet, and on the backing sheet a dry solid layer about 3/8" to about 3/4" thick consisting essentially of an intimate admixture of unset calcined gypsum and an aggregate and a binder, said layer having an exposed surface on its side opposite said backing sheet whereby said layer can be wet with water to form a plastic mass and then trowelled.

2. A plasterboard as claimed in claim 1, said binder being magnesium sulfate in an amount about 0.75 to about 15% by weight of the gypsum on a dry weight basis.

3. A plasterboard as claimed in claim 1, said binder being bentonite in an amount about 1.5 to about 8% by weight of said gypsum on a dry weight basis.

4. A plasterboard comprising a rigid backing sheet, and on the backing sheet a dry solid layer of a mixture of unset calcined gypsum and an aggregate and a binder, said layer having a multiplicity of spaced indentations in its surface opposite the backing sheet.

5. A plasterboard as claimed in claim 4, portions of said layer having recess means at spaced locations so as to provide locations for nailing to a substrate.

6. A plasterboard as claimed in claim 5, said backing sheet being exposed at the bottoms of said recess means.

7. A plasterboard as claimed in claim 4, said indentations having a depth several times their width.

8. A plasterboard as claimed in claim 7, said indentations having a cross-sectional area which is smaller adjacent their bottoms than adjacent their open ends.

9. A plasterboard as claimed in claim 4, the edges of said layer being substantially thicker than the central portions of said layer, at least some of said indentations being disposed in said edges of said layer.

10. A plasterboard as claimed in claim 4, said layer having substantially the same thickness at its edge portions as at its central portions, said indentations being distributed over said edge portions and said central portions of said layer.

References Cited

UNITED STATES PATENTS

| | | | |
|---|---|---|---|
| 971,967 | 10/1910 | Brock | 52—342 |
| 1,868,372 | 7/1932 | Swift | 52—446 X |
| 2,687,359 | 8/1954 | Cleary | 52—443 X |
| 3,100,715 | 8/1963 | Leonard | 106—110 |
| 3,185,297 | 5/1965 | Rutledge | 52—232 X |
| 3,292,326 | 12/1966 | Holzwarth | 52—232 |
| 3,311,516 | 3/1967 | Jaunarajs | 106—110 X |

FOREIGN PATENTS 907,699 10/1962 Great Britain.

ALFRED C. PERHAM, *Primary Examiner.*

U.S. Cl. X.R.

52—443, 453; 106—110; 161—118